United States Patent
You et al.

(10) Patent No.: US 11,778,619 B2
(45) Date of Patent: Oct. 3, 2023

(54) COMMUNICATION METHOD AND APPARATUS, AND COMPUTER STORAGE MEDIUM

(71) Applicant: Huawei Technologies Co., Ltd., Shenzhen (CN)

(72) Inventors: Chunhua You, Shanghai (CN); Qiang Fan, Hefei (CN); Qufang Huang, Shenzhen (CN); Li Zhao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 142 days.

(21) Appl. No.: 17/197,533

(22) Filed: Mar. 10, 2021

(65) Prior Publication Data

US 2021/0195584 A1 Jun. 24, 2021

Related U.S. Application Data

(63) Continuation of application No. PCT/CN2019/105236, filed on Sep. 10, 2019.

(30) Foreign Application Priority Data

Sep. 11, 2018 (CN) .......................... 201811057307.X

(51) Int. Cl.
*H04W 72/21* (2023.01)
*H04W 74/08* (2009.01)

(52) U.S. Cl.
CPC ....... *H04W 72/21* (2023.01); *H04W 74/0833* (2013.01)

(58) Field of Classification Search
CPC ............ H04W 74/002; H04W 74/004; H04W 74/0833
See application file for complete search history.

(56) References Cited

U.S. PATENT DOCUMENTS

2017/0164411 A1  6/2017  Choi et al.
2018/0091276 A1* 3/2018  Huang ................ H04W 48/12
(Continued)

FOREIGN PATENT DOCUMENTS

CN   104981022 A   10/2015
CN   105490790 A    4/2016
(Continued)

OTHER PUBLICATIONS

Ericsson, "Preamble modelling and configuration with multiple SSBs," 3GPP TSG-RAN WG2 #99bis, Tdoc R2-1711176, Prague, Czech Republic, total 4 pages, 3rd Generation Partnership Project, Valbonne, France (Oct. 9-13, 2017).

(Continued)

*Primary Examiner* — Kevin Kim
(74) *Attorney, Agent, or Firm* — Leydig, Voit & Mayer, Ltd.

(57) ABSTRACT

Embodiments of this application provide a communication method and apparatus, and a computer storage medium, to reduce communication latency between a terminal and a base station, and improve a capability of adapting to a latency-sensitive scenario. The method provided in this application includes a terminal that receives at least one uplink configuration and at least one random access configuration from a network device. The uplink configuration is used to indicate a parameter for sending uplink data, and the random access configuration is used to indicate a parameter for sending a preamble. The at least one uplink configuration includes a first uplink configuration, the at least one random access configuration includes a first random access configuration, and there is a correspondence between the first uplink configuration and the first random access configuration.

17 Claims, 5 Drawing Sheets

(56) References Cited

U.S. PATENT DOCUMENTS

2018/0205516 A1   7/2018  Jung et al.
2019/0053319 A1*  2/2019  Jeon .................... H04J 11/0076

FOREIGN PATENT DOCUMENTS

| CN | 106993332 A | | 7/2017 |
|---|---|---|---|
| CN | 108282874 A | | 7/2018 |
| CN | 108289329 A | | 7/2018 |
| OA | 19979 A | * | 8/2021 |
| WO | 2018127223 A1 | | 7/2018 |

OTHER PUBLICATIONS

"3rd Generation Partnership Project; Technical Specification Group Radio Access Network; NR; Radio Resource Control (RRC) protocol specification (Release 15)," 3GPP TS 38.331 V15.2.1, total 303 pages, 3rd Generation Partnership Project, Valbonne, France (Jun. 2018).

"3rd Generation Partnership Project; Technical Specification Group Radio Access Network; NR; Medium Access Control (MAC) protocol specification (Release 15)," 3GPP TS 38.321 V15.2.0, total 73 pages, 3rd Generation Partnership Project, Valbonne, France (Jun. 2018).

* cited by examiner

COMMUNICATION METHOD AND APPARATUS, AND COMPUTER STORAGE MEDIUM

CROSS-REFERENCE TO RELATED APPLICATIONS

This application is a continuation of International Application No. PCT/CN2019/105236, filed on Sep. 10, 2019, which claims priority to Chinese Patent Application No. 201811057307.X, filed on Sep. 11, 2018. The disclosures of the aforementioned applications are hereby incorporated by reference in their entireties.

TECHNICAL FIELD

This application relates to the field of communications technologies, and in particular, to a communication method and apparatus, and a computer storage medium.

BACKGROUND

In an existing communications system, a terminal establishes a connection to a cell by performing a random access process and achieves uplink synchronization. A contention-based random access process includes four steps. The four steps are respectively: 1: A terminal sends a preamble to a base station. 2: The base station sends a random access response for the preamble. 3: The terminal sends, based on the random access response, a third message (Msg3) to the base station on a resource allocated by the base station, and starts or restarts a contention resolution timer, where the Msg3 carries uplink data. 4: The base station sends a contention resolution message to the terminal. If the terminal does not receive the contention resolution message during running of the contention resolution timer, the terminal performs step 1 again. Currently, the contention-based random access process includes a relatively large quantity of steps, resulting in relatively long latency. Consequently, the contention-based random access process cannot well adapt to some latency-sensitive scenarios.

SUMMARY

Embodiments of this application provide a communication method and apparatus, and a computer storage medium, to reduce communication latency between a terminal and a base station and improve a capability of adapting to a latency-sensitive scenario.

According to a first aspect, a communication method is provided, including: A terminal receives, from a network device, at least one uplink configuration used to indicate a parameter for sending uplink data and at least one random access configuration used to indicate a parameter for sending a preamble, where the at least one uplink configuration includes a first uplink configuration, the at least one random access configuration includes a first random access configuration, and there is a correspondence between the first uplink configuration and the first random access configuration; and the terminal sends the uplink data to the network device based on the correspondence by using the first uplink configuration, and sends the preamble to the network device by using the first random access configuration. In the method provided in the first aspect, there is a correspondence between an uplink configuration and a random access configuration, the uplink configuration is used to indicate a parameter for sending uplink data, and the random access configuration is used to indicate a parameter for sending a preamble. Therefore, in a random access process, the terminal may send the uplink data, and the network device may obtain the uplink data based on the correspondence between an uplink configuration and a random access configuration, to reduce steps of a contention-based random access process and reduce latency of the random access process, thereby improving a capability of adapting to a latency-sensitive scenario. In addition, the terminal may implement contention-based random access through two steps, to simplify a random access procedure of the terminal and reduce signaling overheads between the terminal and the network device.

In a possible implementation, the method further includes: The terminal receives a correspondence between the at least one uplink configuration and the at least one random access configuration from the network device. In this possible implementation, a manner of obtaining the correspondence by the terminal is provided.

In a possible implementation, that the terminal sends the uplink data to the network device based on the correspondence by using the first uplink configuration, and sends the preamble to the network device by using the first random access configuration includes: The terminal determines the first uplink configuration corresponding to the uplink data; the terminal determines, based on the correspondence between the first uplink configuration and the first random access configuration, the first random access configuration corresponding to the first uplink configuration; and the terminal sends the uplink data to the network device by using the first uplink configuration, and sends the preamble to the network device by using the first random access configuration. In this possible implementation, a manner of sending the uplink data and the preamble by the terminal is provided. Because the first uplink configuration and the first random access configuration having the correspondence are used, the network device may process the uplink data based on the correspondence, so that the terminal can enable the uplink data and the preamble to be included in a same message for sending.

In a possible implementation, that the terminal determines the first uplink configuration corresponding to the uplink data includes: The terminal determines, based on channel state information, a data amount of to-be-sent data, or service information of to-be-sent data, the first uplink configuration corresponding to the uplink data. In this possible implementation, a plurality of manners of determining the first uplink configuration are provided, to adapt to different application scenarios.

In a possible implementation, the uplink configuration includes any one or more types of the following information: MCS table indication information, MCS indication information, time domain resource indication information, frequency domain resource indication information, and TBS indication information. In this possible implementation, a plurality of types of information that may be included in the uplink configuration are provided, thereby increasing flexibility of the uplink configuration, to adapt to different application scenarios.

In a possible implementation, the uplink configuration further includes any one or more types of the following information: RV indication information, HARQ process indication information, new transmission or retransmission indication information, SCS indication information, precoding indication information, sending repetition count indication information, sending repetition indication information, DMRS mapping type indication information, frequency hopping transmission indication information, piggyback CSI indication information, power offset indication information, waveform indication information, index information of a cell, and index information of a BWP. In this possible implementation, a plurality of types of information that may be included in the uplink configuration are provided, thereby increasing flexibility of the uplink configuration, to adapt to different application scenarios.

In a possible implementation, the method further includes: The terminal sends uplink control information corresponding to the uplink data to the network device, where the uplink control information includes any one or more types of the following information: RV indication information, HARQ process indication information, new transmission or retransmission indication information, SCS indication information, precoding indication information, sending repetition count indication information, sending repetition indication information, DMRS mapping type indication information, frequency hopping transmission indication information, piggyback CSI indication information, power offset indication information, waveform indication information, index information of a cell during new transmission, index information of a BWP during new transmission, and HARQ process information during new transmission. In this possible implementation, one or more types of information (or referred to as parameters) used for indicating to send the uplink data are included in the uplink control information corresponding to the uplink data, so that the terminal can more flexibly send the uplink data.

In a possible implementation, the method further includes: The terminal receives a response message of the uplink data from the network device, where the response message includes information used to indicate whether the response message includes an uplink grant field and/or information used to indicate whether the response message includes a contention resolution field. In this possible implementation, if the response message includes the information used to indicate that the response message includes the uplink grant field and/or the information used to indicate that the response message includes the contention resolution field, the terminal may further obtain an uplink grant and/or contention resolution information based on the response message.

According to a second aspect, a communication method is provided, including: A network device receives, from a terminal, a preamble sent by using a first random access configuration, where there is a correspondence between the first random access configuration and a first uplink configuration; and the network device processes uplink data based on the correspondence by using the first uplink configuration corresponding to the first random access configuration. In the method provided in the second aspect, there is a correspondence between an uplink configuration and a random access configuration, the uplink configuration is used to indicate a parameter for sending uplink data, and the random access configuration is used to indicate a parameter for sending a preamble. Therefore, in a random access process, the terminal may send the uplink data, and the network device may obtain the uplink data based on the correspondence between an uplink configuration and a random access configuration, to reduce steps of a contention-based random access process and reduce latency of the random access process, thereby improving a capability of adapting to a latency-sensitive scenario. In addition, the terminal may implement contention-based random access through two steps, to simplify a random access procedure of the terminal and reduce signaling overheads between the terminal and the network device.

In a possible implementation, the method further includes: The network device sends at least one uplink configuration including the first uplink configuration and at least one random access configuration including the first random access configuration to the terminal. In this possible implementation, a manner of obtaining the at least one uplink configuration and the at least one random access configuration by the terminal is provided.

In a possible implementation, the method further includes: The network device sends a correspondence between the at least one uplink configuration and the at least one random access configuration to the terminal. In this possible implementation, a manner of obtaining the correspondence by the terminal is provided.

In a possible implementation, the uplink configuration includes any one or more types of the following information: MCS table indication information, MCS indication information, time domain resource indication information, frequency domain resource indication information, and TBS indication information. In this possible implementation, a plurality of types of information that may be included in the uplink configuration are provided, thereby increasing flexibility of the uplink configuration, to adapt to different application scenarios.

In a possible implementation, the uplink configuration further includes any one or more types of the following information: RV indication information, HARQ process indication information, new transmission or retransmission indication information, SCS indication information, precoding indication information, sending repetition count indication information, sending repetition indication information, DMRS mapping type indication information, frequency hopping transmission indication information, piggyback CSI indication information, power offset indication information, waveform indication information, index information of a cell, and index information of a BWP. In this possible implementation, a plurality of types of information that may be included in the uplink configuration are provided, thereby increasing flexibility of the uplink configuration, to adapt to different application scenarios.

In a possible implementation, the method further includes: The network device receives uplink control information corresponding to the uplink data from the terminal; and that the network device processes uplink data based on the correspondence by using the first uplink configuration corresponding to the first random access configuration includes: The network device process the uplink data based on the correspondence between the first uplink configuration and the first random access configuration by using the uplink control information and the first uplink configuration corresponding to the first random access configuration, where the uplink control information includes any one or more types of the following information: RV indication information, HARQ process indication information, new transmission or retransmission indication information, SCS indication information, precoding indication information, sending repetition count indication information, sending repetition indication information, DMRS mapping type indication information, frequency hopping transmission indication information, piggyback CSI indication information, power offset indication information, waveform indication information, index information of a cell during new transmission, index information of a BWP during new transmission, and HARQ process information during new transmission. In this possible implementation, one or more types of information (or referred to as parameters) used for indicating to send the uplink data are included in the uplink control information corresponding to the uplink data, so that the network device can more flexibly process the uplink data.

In a possible implementation, the method further includes: The network device sends a response message of the uplink data to the terminal, where the response message includes information used to indicate whether the response message includes an uplink grant field and/or information used to indicate whether the response message includes a contention resolution field. In this possible implementation, if the response message includes the information used to indicate that the response message includes the uplink grant field and/or the information used to indicate that the response message includes the contention resolution field, the terminal may further obtain an uplink grant and/or contention resolution information based on the response message.

According to a third aspect, a communications apparatus is provided, and the apparatus has a function of implementing any method provided in the first aspect. The function may be implemented by hardware, or may be implemented by hardware executing corresponding software. The hardware or the software includes one or more units corresponding to the foregoing function. The apparatus may exist in a product form of a chip.

According to a fourth aspect, a communications apparatus is provided, and the apparatus has a function of implementing any method provided in the second aspect. The function may be implemented by hardware, or may be implemented by hardware executing corresponding software. The hardware or the software includes one or more units corresponding to the foregoing function. The apparatus may exist in a product form of a chip.

According to a fifth aspect, a communications apparatus is provided, including a memory and a processor. The memory and the processor are connected through a communications bus, the memory is configured to store an instruction, and the processor executes the instruction to implement any method provided in the first aspect. The apparatus may exist in a product form of a chip.

According to a sixth aspect, a communications apparatus is provided, including a memory and a processor. The memory and the processor are connected through a communications bus, the memory is configured to store an instruction, and the processor executes the instruction to implement any method provided in the second aspect. The apparatus may exist in a product form of a chip.

According to a seventh aspect, a communications apparatus is provided, including at least one processor and an interface circuit. The at least one processor is configured to communicate with a network device by using the interface circuit, to perform any method provided in the first aspect. The apparatus may exist in a product form of a chip.

According to an eighth aspect, a communications apparatus is provided, including at least one processor and an interface circuit. The at least one processor is configured to communicate with a terminal by using the interface circuit, to perform any method provided in the second aspect. The apparatus may exist in a product form of a chip.

According to a ninth aspect, a terminal is provided, including the apparatus provided in the third aspect, the fifth aspect, or the seventh aspect.

According to a tenth aspect, a network device is provided, including the apparatus provided in the fourth aspect, the sixth aspect, or the eighth aspect.

According to an eleventh aspect, a communications system is provided, including: the apparatus provided in the third aspect and the apparatus provided in the fourth aspect; or the apparatus provided in the fifth aspect and the apparatus provided in the sixth aspect; or the apparatus provided in the seventh aspect and the apparatus provided in the eighth aspect; or a terminal including the apparatus provided in the third aspect and a network device including the apparatus provided in the fourth aspect; or a terminal including the apparatus provided in the fifth aspect and a network device including the apparatus provided in the sixth aspect; or a terminal including the apparatus provided in the seventh aspect and a network device including the apparatus provided in the eighth aspect.

According to a twelfth aspect, a computer storage medium is provided, including a computer instruction. When the computer instruction is run on a processor, the processor is enabled to perform any method provided in the first aspect.

According to a thirteenth aspect, a computer storage medium is provided, including a computer instruction. When the computer instruction is run on a processor, the processor is enabled to perform any method provided in the second aspect.

According to a fourteenth aspect, a computer program product including an instruction is provided. When the instruction is run on a processor, the processor is enabled to perform any method provided in the first aspect.

According to a fifteenth aspect, a computer program product including an instruction is provided. When the instruction is run on a processor, the processor is enabled to perform any method provided in the second aspect.

For a technical effect brought by any implementation in the third aspect to the fifteenth aspect, refer to the technical effect brought by a corresponding implementation in the first aspect or the second aspect. Details are not described herein again.

DESCRIPTION OF EMBODIMENTS

The following describes technical solutions in embodiments of this application with reference to the accompanying drawings in the embodiments of this application. The term "and/or" in this specification describes only an association relationship for describing associated objects and represents that three relationships may exist. For example, A and/or B may represent the following three cases: Only A exists, both A and B exist, and only B exists. In addition, "at least one" means one or more, and "a plurality of" means two or more.

It should be noted that the technical solutions in the embodiments of this application may be applied to various communications systems, for example, a global system for mobile communications (GSM), an evolved universal terrestrial radio access (E-UTRA) system, a universal mobile telecommunications system (UMTS) system and a UMTS evolved version, long term evolution (LTE) and various evolved LTE-based versions, a 5th generation (5G) communications system, and a next-generation communications system such as new radio (NR). In addition, the foregoing communications system may be further applied to a future-oriented communications technology to which the technical solutions provided in the embodiments of this application are applicable.

A network device in the embodiments of this application is a device in a radio network, for example, a radio access network (RAN) node for accessing a terminal to the radio network. The RAN node may be a new generation NodeB (gNB or gNodeB), a transmission reception point (TRP), an evolved NodeB (eNB), a radio network controller (RNC), a NodeB (NB), a base station controller (BSC), a base transceiver station (BTS), a home NodeB (for example, a home evolved NodeB, or a home Node B) (HNB), a baseband unit (BBU), a wireless fidelity (Wi-fi) access point (AP), or the like. In a network structure, the network device may include a centralized unit (CU) node, a distributed unit (DU) node, or a RAN device including a CU node and a DU node.

The terminal may also be referred to as a user equipment (UE), a mobile station (MS), a mobile terminal (MT), or the like, and is a device providing voice/data connectivity for a user, for example, a handheld device having a wireless connection function, or a vehicle-mounted device. The terminal may be a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like.

Figure 1:
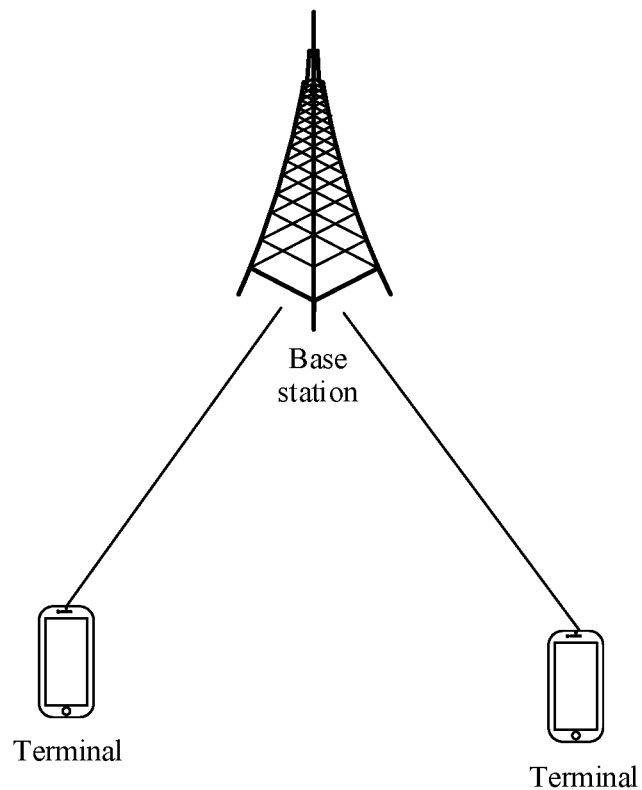
FIG. 1 is a schematic diagram of an application scenario according to an embodiment of this application.

For example, when the network device is a base station, as shown in FIG. 1, the method provided in the embodiments of this application may be applied to the communications system shown in FIG. 1. The terminal accesses the radio network by using the base station, to obtain a service of an external network (for example, the Internet) through the radio network, or to communicate with another terminal through the radio network.

In the prior art, a quantity of steps of a contention-based random access process is relatively large, latency is relatively large, and it is difficult to adapt to some communication scenarios that have a relatively high latency requirement. Therefore, the embodiments of this application provide a communication method. In the method, there is a correspondence between an uplink configuration and a random access configuration, the uplink configuration is used to indicate a parameter for sending uplink data, and the random access configuration is used to indicate a parameter for sending a preamble. Therefore, in a random access process, the terminal may send the uplink data, and the network device may obtain the uplink data based on the correspondence between an uplink configuration and a random access configuration, thereby implementing contention-based random access of the terminal through two steps, simplifying a random access procedure of the terminal, reducing communication latency between the terminal and the network device, and further reducing signaling overheads.

In the following embodiments, in the description of "information A associated with an uplink configuration", when the information A is in the uplink configuration, "information A associated with an uplink configuration" means "the information A in the uplink configuration", and when the information A is not in the uplink configuration, "information A associated with an uplink configuration" means "the information A corresponding to the uplink configuration". Similarly, in the description of "information B associated with a random access configuration", when the information B is in the random access configuration, "information B associated with a random access configuration" means "the information B in the random access configuration", and when the information B is not in the random access configuration, "information B associated with a random access configuration" means "the information B corresponding to the random access configuration".

Figure 2:
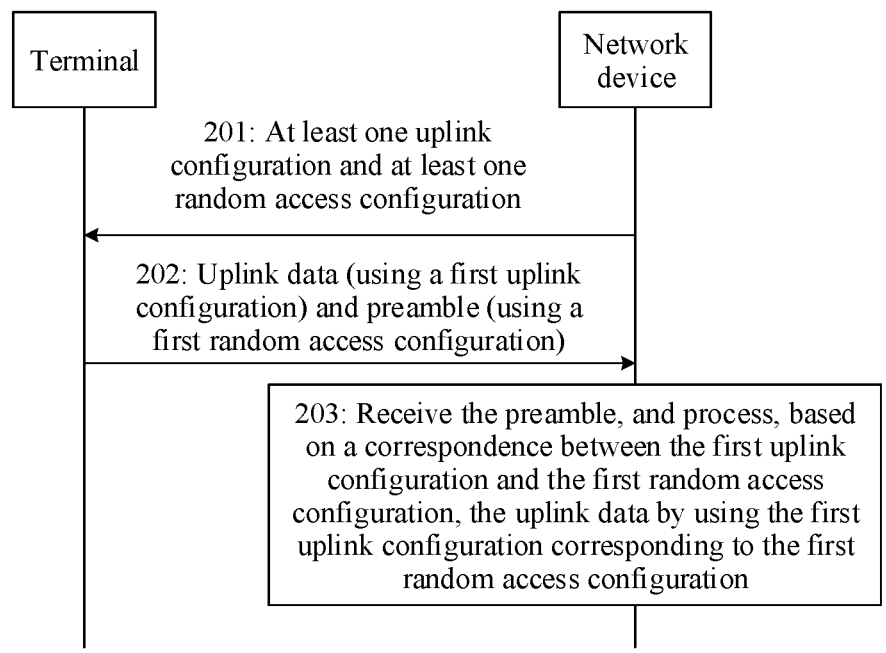
FIG. 2 is a flowchart of a communication method according to an embodiment of this application.

As shown in FIG. 2, an embodiment of this application provides a communication method, including the following steps.

201. A terminal receives at least one uplink configuration and at least one random access configuration from a network device.

The uplink configuration is used to indicate a parameter for sending uplink data, and the random access configuration is used to indicate a parameter for sending a preamble.

Before step 201, the method may further include the following steps. Step (11): The network device sends the at least one uplink configuration and the at least one random access configuration to the terminal. When the terminal is in an idle mode or an inactive mode, the network device broadcasts the at least one uplink configuration and the at least one random access configuration to the terminal; or when the terminal is in a connected mode, the network device sends radio resource control (RRC) signaling (for example, an RRC reconfiguration message) to the terminal, where the RRC signaling includes the at least one uplink configuration and the at least one random access configuration.

There is a correspondence between the at least one uplink configuration and the at least one random access configuration. Specifically, one uplink configuration may correspond to one random access configuration, or one uplink configuration may correspond to a plurality of random access configurations, or one random access configuration may correspond to a plurality of uplink configurations. Information included in an uplink configuration and information included in a random access configuration corresponding to the uplink configuration are partially or totally different.

For example, as shown in Table 1, Table 1 shows a correspondence between an uplink configuration and a random access configuration.

TABLE 1

| Uplink configuration | Random access configuration |
| --- | --- |
| Uplink configuration 1 | Random access configuration 1 |
| Uplink configuration 2 | Random access configuration 2 |
| Uplink configuration 3 | Random access configuration 3 |
| | Random access configuration 4 |

The correspondence between the at least one uplink configuration and the at least one random access configuration in the terminal may be preconfigured (for example, specified in a protocol), or may be sent by the network device to the terminal. If the correspondence between the at least one uplink configuration and the at least one random access configuration is sent by the network device to the terminal, the method may further include: Step (21): The network device sends the correspondence between the at least one uplink configuration and the at least one random access configuration to the terminal. Step (22): The terminal receives the correspondence between the at least one uplink configuration and the at least one random access configuration from the network device.

When the terminal is in an idle mode (IDLE mode) or an inactive mode (INACTIVE mode), the network device broadcasts the correspondence between the at least one uplink configuration and the at least one random access configuration to the terminal; or when the terminal is in a connected mode (CONNECTED mode), the network device sends RRC signaling (for example, an RRC reconfiguration message) to the terminal, where the RRC signaling includes the correspondence between the at least one uplink configuration and the at least one random access configuration.

The at least one uplink configuration includes a first uplink configuration, the at least one random access configuration includes a first random access configuration, and there is a correspondence between the first uplink configuration and the first random access configuration. The first uplink configuration is an uplink configuration applicable to current uplink data sending, and the first random access configuration is a random access configuration that has a correspondence with the first uplink configuration. In different uplink data or different communication scenarios, selection of the first uplink configuration is different. This is not limited herein. For example, based on the example shown in Table 1, the first uplink configuration may be the uplink configuration 2, and the first random access configuration may be the random access configuration 2.

In one case, the uplink configuration includes any one or more types of the following information: modulation and coding scheme (MCS) table indication information, MCS indication information, time domain resource indication information, frequency domain resource indication information, transport block size (TBS) indication information, redundancy version (RV) indication information, hybrid automatic repeat request (HARQ) process indication information, new transmission or retransmission indication information, subcarrier spacing (SCS) indication information, precoding indication information, sending repetition count indication information, sending repetition indication information, demodulation reference signal (DMRS) mapping type indication information, frequency hopping transmission indication information, piggyback channel state information (CSI) indication information, power offset indication information, waveform indication information, index information of a cell, and index information of a bandwidth part (BWP).

A BWP is some frequency domain resources in carrier bandwidth allocated by the network device to the terminal. A size of the BWP is less than or equal to a bandwidth capability of the terminal, namely, maximum bandwidth supported by the terminal. The BWP may be consecutive frequency domain resources. For example, the BWP may include a plurality of consecutive subcarriers. For another example, the BWP may include a plurality of consecutive physical resource blocks (PRB). The BWP may be alternatively nonconsecutive frequency domain resources. The consecutive frequency domain resources help to reduce resource allocation complexity, and the nonconsecutive frequency domain resources help to utilize discrete resources. The terminal may support a plurality of BWPs, that is, the network device may configure the plurality of BWPs for the terminal. When the plurality of BWPs are configured, the BWPs may overlap, or the BWPs may not overlap. In addition, subcarrier spacings of frequency domain resources included in different BWPs may be the same or may be different.

CSI may be information that is sent by the terminal to the network device and that is used to indicate channel quality of a downlink channel. The CSI may be obtained based on a downlink reference signal. The CSI may include one or more types of the following information: a channel quality indicator (CQI) that is used by the network device to determine a modulation and coding scheme used for subsequent scheduling, a rank indication (RI) that is used to indicate a quantity of valid data layers of a physical downlink shared channel (PDSCH) and that is used to notify the network device of a quantity of code words currently supported by the terminal, a precoding matrix indicator (PMI) that is used to indicate an index of a codebook matrix, a precoding type indicator (PTI), a channel state information reference signal resource indicator (CRI), a synchronization signal/broadcast channel block resource indicator (SSBRI), layer 1-reference signal received power (L1-RSRP), and the like.

In another case, the uplink configuration includes any one or more types of the following information: MCS table indication information, MCS indication information, time domain resource indication information, frequency domain resource indication information, and TBS indication information.

In this embodiment of this application, a plurality of types of information that may be included in the uplink configuration are provided, thereby increasing flexibility of the uplink configuration, to adapt to different application scenarios.

The random access configuration includes any one or more types of the following information: time domain resource indication information, frequency domain resource indication information, at least one preamble index, root sequence indication information, maximum transmission count indication information, receive window length indication information, preamble power ramp step indication information, SCS indication information, scaling factor indication information of a backoff indication, and sending repetition count indication information.

For meanings of information that may be included in the uplink configuration and the random access configuration, refer to the following descriptions.

202. The terminal sends the uplink data to the network device based on the correspondence between the first uplink configuration and the first random access configuration by using the first uplink configuration, and sends the preamble to the network device by using the first random access configuration.

Optionally, the uplink data includes one or more types of control plane data of the terminal and user plane data of the terminal. The uplink data may carry an identifier of the terminal, and the identifier is used by the network device to identify the terminal to which the uplink data belongs. The preamble may be used to perform uplink synchronization with the network device. The uplink data and the preamble may be included in a same message, for example, both are included in a first message (Msg1), or may be included in different messages.

Optionally, in specific implementation, step 202 includes: Step (31): The terminal determines the first uplink configuration corresponding to the uplink data. Step (32): The terminal determines, based on the correspondence between the first uplink configuration and the first random access configuration, the first random access configuration corresponding to the first uplink configuration. Step (33): The terminal sends the uplink data to the network device by using the first uplink configuration, and sends the preamble to the network device by using the first random access configuration.

In one case, in specific implementation, step (31) may include: The terminal determines, based on channel state information, a data amount of to-be-sent data, or service information of to-be-sent data, the first uplink configuration corresponding to the uplink data.

The uplink data may be a part or all of the to-be-sent data.

The channel state information may be downlink path loss information or reference signal received power (RSRP). For example, if a downlink path loss is less than a first value, the terminal selects the uplink configuration 2 (in other words, the first uplink configuration is the uplink configuration 2) to send the uplink data, and sends the preamble to the network device based on the random access configuration 2 corresponding to the uplink configuration 2. Otherwise, the terminal selects the uplink configuration 1 (in other words, the first uplink configuration is the uplink configuration 1) to send the uplink data, and sends the preamble to the network device based on the random access configuration 1 corresponding to the uplink configuration 1. A calculation manner of the first value may be: PCMAX−preamble received target power (preamble received target power)−uplink data and preamble power offset (data-deltapreamble)−power offset associated with the uplink configuration (messagePowerOffset). PCMAX is maximum transmit power of a cell in which the terminal initiates random access (of the serving cell performing the random access procedure).

The data amount of the to-be-sent data calculated by the terminal includes a data amount of uplink to-be-sent data and a quantity of bytes of a medium access control (MAC) header, and may further include a quantity of bytes of a MAC control element (MAC CE). Different data amounts of to-be-sent data may correspond to different uplink configurations. For example, if the uplink configuration 1 and the uplink configuration 2 are included, when the data amount of the to-be-sent data exceeds a preset threshold, the terminal selects the uplink configuration 2 (in other words, the first uplink configuration is the uplink configuration 2) to send the uplink data, and sends the preamble to the network device based on the random access configuration 2 corresponding to the uplink configuration 2. Otherwise, the terminal selects the uplink configuration 1 (in other words, the first uplink configuration is the uplink configuration 1) to send the uplink data, and sends the preamble to the network device based on the random access configuration 1 corresponding to the uplink configuration 1. For example, if an MCS1 associated with the uplink configuration 1 can transmit 600 bytes of data at most, and an MCS2 associated with the uplink configuration 2 can transmit 1000 bytes of data at most, the preset threshold may be set to 600 bytes.

The service information of the to-be-sent data may be a quality of service (QoS) requirement of the to-be-sent data, a logical channel to which the to-be-sent data belongs, a reliability requirement of the to-be-sent data, or a latency requirement of the to-be-sent data. Different service information may correspond to different uplink configurations. In this case, the terminal may determine, based on service information corresponding to the uplink data, an uplink configuration corresponding to the uplink data. A correspondence between service information and an uplink configuration may be configured by the network device.

In another case, in specific implementation, step (31) may include: The terminal determines, based on a plurality of pieces of information of channel state information, a data amount of to-be-sent data, and service information of the to-be-sent data, an uplink configuration corresponding to the uplink data.

For example, when the channel state information is downlink path loss information, the terminal may further determine, based on the data amount of the to-be-sent data and the downlink path loss information, the uplink configuration corresponding to the uplink data. For example, an MCS1 associated with the uplink configuration 1 can transmit 600 bytes of data at most, and an MCS2 associated with the uplink configuration 2 can transmit 1000 bytes of data at most. If the data amount of the to-be-sent data exceeds 600 bytes and a downlink loss is less than a first value, the terminal selects the uplink configuration 2 (in other words, the first uplink configuration is the uplink configuration 2) to send the uplink data, and sends the preamble to the network device based on the random access configuration 2 corresponding to the uplink configuration 2. Otherwise, the terminal selects the uplink configuration 1 (in other words, the first uplink configuration is the uplink configuration 1) to send the uplink data, and sends the preamble to the network device based on the random access configuration 1 corresponding to the uplink configuration 1. For a calculation manner of the first value, refer to the foregoing descriptions. Details are not described herein again.

In this embodiment of this application, a plurality of manners of determining the first uplink configuration are provided, to adapt to different application scenarios.

In step 202 or step (33), the terminal may perform first processing on the uplink data by using information included in the first uplink configuration, and send the uplink data to the network device. When the information included in the first uplink configuration is different, the first processing is also different. For details, refer to the following descriptions.

The preamble may be sent on a physical random access channel (PRACH), and the uplink data may be sent on a physical uplink shared channel (PUSCH).

Figure 3:
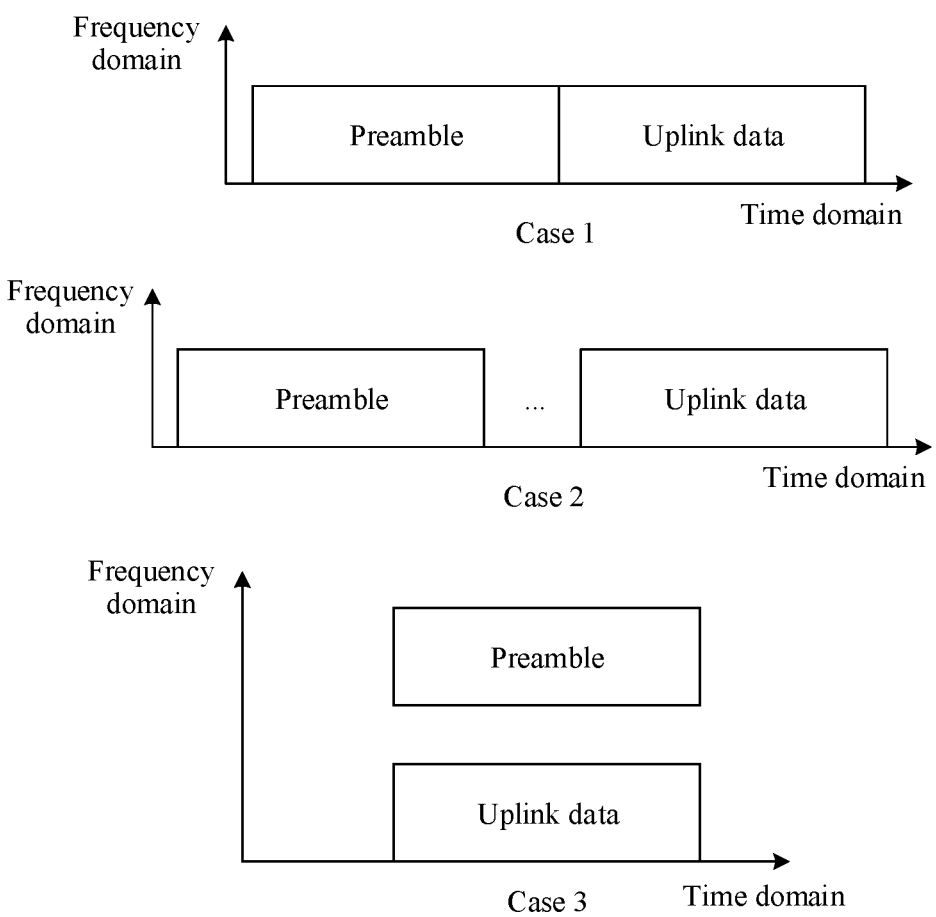
FIG. 3 is a schematic diagram of a time-frequency resource location according to an embodiment of this application.

Referring to FIG. 3, a location relationship between a time-frequency resource that carries the uplink data and a time-frequency resource that carries the preamble may be any one of case 1 to case 3.

Case 1: A time domain resource that carries the uplink data and a time domain resource that carries the preamble are consecutive, and a frequency domain resource that carries the uplink data and a frequency domain resource that carries the preamble may be the same or may be different.

Case 2: The time domain resource that carries the uplink data and the time domain resource that carries the preamble are nonconsecutive, and the frequency domain resource that carries the uplink data and the frequency domain resource that carries the preamble may be the same or may be different.

Case 3: The time domain resource that carries the uplink data and the time domain resource that carries the preamble are in a same slot, and the frequency domain resource that carries the uplink data and the frequency domain resource that carries the preamble are different.

203. The network device receives the preamble from the terminal, and processes the uplink data (denoted as second processing) based on the correspondence between the first uplink configuration and the first random access configuration by using the first uplink configuration corresponding to the first random access configuration.

In specific implementation, step 203 may include: Step (41): The network device receives the preamble from the terminal. Step (42): The network device determines the first random access configuration based on the preamble. Step (43): The network device determines, based on the correspondence between the first uplink configuration and the first random access configuration, the first uplink configuration corresponding to the first random access configuration. Step (44): The network device performs second processing on the uplink data based on the first uplink configuration.

In specific implementation of step (42), the network device may determine the first random access configuration based on the preamble and/or a time-frequency resource location used for transmitting the preamble.

Specifically, the network device may determine that a random access configuration to which an index of the preamble belongs and/or a random access configuration corresponding to the time-frequency resource location of the preamble are/is the first random access configuration.

In step 203 or step (44), the network device may perform second processing on the uplink data by using information included in the first uplink configuration. When the information included in the first uplink configuration is different, the second processing is also different. For details, refer to the following descriptions.

After step 203, the method may further include: Step (51): The network device sends a response message of the uplink data to the terminal, where the response message includes first indication information and/or second indication information, the first indication information is used to indicate whether the response message includes an uplink grant field, and the second indication information is used to indicate whether the response message includes a contention resolution field. Step (52): The terminal receives the response message of the uplink data from the network device. When both the uplink data and the preamble are included in the first message, the response message may also be referred to as a response message of the first message.

The first indication information and the second indication information may be located in a reserved bit in the response message or a reserved bit in a MAC header of the response message.

When the first indication information is used to indicate that the response message includes the uplink grant field, the response message may include an uplink grant (UL grant), and the terminal may obtain the uplink grant (UL grant) from the response message. When the second indication information indicates that the response message includes the contention resolution field, the response message may include contention resolution information, and the terminal may obtain the contention resolution information from the response message. The contention resolution information is used to notify the terminal that random access is completed. The contention resolution information may be a part of content of information received from the terminal, for example, may include identifier information of the terminal. Alternatively, contention resolution may be determined through terminal identifier descrambling. For example, when the response message is downlink control information (DCI), the network device scrambles cyclic redundancy check (CRC) information of the DCI by using a terminal identifier such as a cell radio network temporary identifier (C-RNTI). The terminal descrambles the CRC information, and then checks the DCI by using the descrambled CRC information. If no transmission error is detected, the DCI is sent to the terminal, and contention resolution succeeds. For another example, when the response message is a MAC CE, CRC information of DCI indicating a MAC CE resource location may be scrambled. The identifier information of the terminal may be sent by the network device to the terminal, and may be allocated by an access network device or may be allocated by a core network device; or may be generated by the terminal, for example, a random value generated by the terminal.

Optionally, the response message further includes a timing advance command and/or a random access preamble identifier (RAPID).

Optionally, the response message may be carried in DCI or a MAC CE.

Optionally, the response message may further include a HARQ feedback, and the HARQ feedback is used to indicate whether the uplink data is successfully decoded by the network device. A time-frequency resource location of the HARQ feedback in the response message may be mapped to a location by using a time domain resource or a frequency domain resource or a preamble resource associated with a random access configuration, to receive the HARQ feedback in the response message.

Optionally, the method further includes: Step (61): The terminal sends uplink control information corresponding to the uplink data to the network device. Step (62): The network device receives the uplink control information corresponding to the uplink data from the terminal. In this case, in specific implementation, step 203 may include: The network device receives the preamble from the terminal, and the network device performs second processing on the uplink data based on the correspondence between the first uplink configuration and the first random access configuration by using the uplink control information and the first uplink configuration corresponding to the first random access configuration.

The uplink control information includes any one or more types of the following information: RV indication information, HARQ process indication information, new transmission or retransmission indication information, SCS indication information, precoding indication information, sending repetition count indication information, sending repetition indication information, DMRS mapping type indication information, frequency hopping transmission indication information, piggyback CSI indication information, power offset indication information, waveform indication information, index information of a cell during new transmission, index information of a BWP during new transmission, and HARQ process information during new transmission.

In this case, the uplink configuration may include any one or more types of the following information: MCS table indication information, MCS indication information, time domain resource indication information, frequency domain resource indication information, and TBS indication information.

In this embodiment of this application, one or more types of information (or referred to as parameters) used for indicating to send the uplink data are included in the uplink control information corresponding to the uplink data, so that the terminal can more flexibly send the uplink data.

The network device may perform second processing on the uplink data by using information included in the uplink control information. When the information included in the uplink control information is different, the second processing is also different. For details, refer to the following descriptions.

In this case, the uplink configuration may indicate a parameter for sending the uplink data, or may indicate a parameter for sending the uplink control information. In this case, the time domain resource indication information associated with the uplink configuration may include time domain resource indication information used to transmit the uplink data and/or the uplink control information, and the frequency domain resource indication information may include frequency domain resource indication information used to transmit the uplink data and/or the uplink control information. Certainly, the parameter for sending the uplink data and the parameter for sending the uplink control information may be alternatively included in different uplink configurations. This is not specifically limited in this embodiment of this application. An example in which the uplink data and the uplink control information correspond to a same uplink configuration is used for description in this specification.

The uplink control information, the uplink data, and the preamble may be included in a same message, for example, all are included in a first message (Msg1), or may be included in different messages.

A location relationship among a time-frequency resource that carries the uplink data, a time-frequency resource that carries the uplink control information, and a time-frequency resource that carries the preamble may be any one of case 4 to case 6.

Case 4: A time domain resource that carries the uplink data, a time domain resource that carries the uplink control information, and a time domain resource that carries the preamble are consecutive, and any two of a frequency domain resource that carries the uplink data, a frequency domain resource that carries the uplink control information, and a frequency domain resource that carries the preamble may be the same or different.

Case 5: The time domain resource that carries the uplink data, the time domain resource that carries the uplink control information, and the time domain resource that carries the preamble are nonconsecutive, and any two of the frequency domain resource that carries the uplink data, the frequency domain resource that carries the uplink control information, and the frequency domain resource that carries the preamble may be the same or different.

Case 6: The time domain resource that carries the uplink data, the time domain resource that carries the uplink control information, and the time domain resource that carries the preamble are in a same slot, and any two of the frequency domain resource that carries the uplink data, the frequency domain resource that carries the uplink control information, and the frequency domain resource that carries the preamble are different.

According to the method provided in this embodiment of this application, the correspondence between an uplink configuration and a random access configuration is configured on both the terminal and the network device. Therefore, the terminal may send the uplink data in a random access process, to reduce steps of a contention-based random access process and reduce latency of the random access process, thereby improving a capability of adapting to a latency-sensitive scenario. In addition, the terminal may implement contention-based random access through two steps, to simplify a random access procedure of the terminal and reduce signaling overheads between the terminal and the network device. In addition, the terminal may select different uplink configurations to process uplink data of different TBSs, so that TB transmission of a plurality of TBSs can be supported.

To make the solutions in the embodiments of this application clearer, the following specifically describes meanings of information that may be included in an uplink configuration and uplink control information in the embodiments of this application and first processing and second processing corresponding to the information. First processing corresponding to one piece of information is a processing action when the terminal uses the information, and second processing corresponding to one piece of information is a processing action when the network device uses the information.

(1) MCS Table Indication Information

The MCS table indication information is information used to indicate an MCS table, and the MCS table indication information may be an identifier of the MCS table (for example, an index of the MCS table). The MCS table includes at least one MCS index, and each MCS index corresponds to one set of parameters. For example, the set of parameters may include a modulation order and a TBS index. Table 2 shows an example of an MCS table. In Table 2, each MCS index corresponds to one modulation order and one TBS index, and one modulation order and one TBS index correspond to one physical transmission rate. In other words, each MCS index corresponds to a physical transmission rate in one set of parameters.

TABLE 2

| MCS index | Modulation order | TBS index |
| --- | --- | --- |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | |
| 30 | 4 | |
| 31 | 6 | |

First processing: The terminal modulates the uplink data and/or the uplink control information by using a modulation order corresponding to an MCS index in the MCS table indicated by the MCS table indication information, and/or the terminal determines a coding scheme of the uplink data and/or the uplink control information by using a TBS indicated by a TBS index corresponding to an MCS index in the MCS table indicated by the MCS table indication information.

Second processing: The network device demodulates the uplink data and/or the uplink control information by using the modulation order corresponding to the MCS index in the MCS table indicated by the MCS table indication information, and/or the network device determines a decoding scheme of the uplink data and/or the uplink control information by using the TBS indicated by the TBS index corresponding to the MCS index in the MCS table indicated by the MCS table indication information.

(2) MCS Indication Information

The MCS indication information is information used to indicate an MCS, and the MCS indication information may be an MCS index.

First processing: The terminal modulates the uplink data and/or the uplink control information by using a modulation order indicated by the MCS indication information, and/or the terminal determines a coding scheme of the uplink data and/or the uplink control information by using a TBS indicated by a TBS index corresponding to the MCS indication information.

Second processing: The network device demodulates the uplink data and/or the uplink control information by using the modulation order indicated by the MCS indication information, and/or the network device determines a decoding scheme of the uplink data and/or the uplink control information by using the TBS indicated by the TBS index corresponding to the MCS indication information.

(3) Time Domain Resource Indication Information

The time domain resource indication information is information used to indicate a time domain resource, and the time domain resource indication information may include time domain resource indication information of the uplink data and/or the uplink control information. The time domain resource indication information may be slot or symbol information.

First processing: The terminal sends the uplink data and/or the uplink control information on a time domain resource indicated by the time domain resource indication information.

Second processing: The network device receives the uplink data and/or the uplink control information on the time domain resource indicated by the time domain resource indication information.

(4) Frequency Domain Resource Indication Information

The frequency domain resource indication information is information used to indicate a frequency domain resource, and the frequency domain resource indication information may include frequency domain resource indication information of the uplink data and/or the uplink control information. The frequency domain resource indication information may be a PRB index.

First processing: The terminal sends the uplink data and/or the uplink control information on a frequency domain resource indicated by the frequency domain resource indication information.

Second processing: The network device receives the uplink data and/or the uplink control information on the frequency domain resource indicated by the frequency domain resource indication information.

(5) TBS Indication Information

The TBS indication information is information used to indicate a TBS, and the TBS indication information may be a TBS index.

First processing: The terminal packages the sent uplink data based on a TBS indicated by the TBS indication information.

(6) RV Indication Information

The RV indication information is information used to indicate an RV, and the RV indication information may be an RV index.

First processing: The terminal sends the uplink data based on an RV indicated by the RV indication information.

Second processing: The network device decodes the uplink data based on the RV indicated by the RV indication information.

(7) HARQ Process Indication Information

The HARQ process indication information is information used to indicate a HARQ process, and the HARQ process indication information may be a HARQ process index.

First processing: The terminal sends the uplink data by using a HARQ process indicated by the HARQ process indication information.

Second processing: The network device receives the uplink data that is sent by the terminal in the HARQ process indicated by the HARQ process indication information.

(8) New Transmission or Retransmission Indication Information

The new transmission or retransmission indication information is used to indicate whether the uplink data is newly transmitted data or retransmitted data, and the new transmission or retransmission indication information may be two different values of one bit. For example, a bit value 1 corresponds to the new transmission indication information, and a bit value 0 corresponds to the retransmission indication information.

First processing: The terminal newly transmits or retransmits the uplink data to the network device according to the new transmission or retransmission indication information.

Second processing: The network device performs decoding or soft combination on the uplink data according to the new transmission or retransmission indication information.

(9) SCS Indication Information

The SCS indication information is information used to indicate an SCS, and the SCS indication information may be an SCS index.

First processing: The terminal sends the uplink data by using an SCS indicated by the SCS indication information.

Second processing: The network device receives the uplink data by using the SCS indicated by the SCS indication information.

(10) Precoding Indication Information

The precoding indication information is information used to indicate a precoding manner.

The precoding indication information may be a value of several bits, and different values of these bits represent different precoding manners.

First processing: The terminal performs precoding on the uplink data based on a precoding manner indicated by the precoding indication information.

Second processing: The network device decodes the uplink data based on the precoding manner indicated by the precoding indication information.

(11) Sending Repetition Count Indication Information

The sending repetition count indication information is information used to indicate a sending repetition count. The sending repetition count indication information may be a value of several bits, and different values of these bits represent different sending repetition counts.

First processing: The terminal repeatedly sends the uplink data to the network device based on a sending repetition count indicated by the sending repetition count indication information.

Second processing: The network device determines, according to the sending repetition count indication information, which piece of received data is repeated data, and then performs soft combination processing.

(12) Sending Repetition Indication Information

First processing: The terminal repeatedly sends the uplink data to the network device according to the sending repetition indication information.

Second processing: The network device determines, according to the sending repetition indication information, that repeated data is to be received.

(13) DMRS Mapping Type Indication Information

The DMRS mapping type indication information is used to indicate a DMRS mapping type, and the DMRS mapping type indication information may be a DMRS mapping type index. Resource elements corresponding to different DMRS mapping types are different. For example, a DMRS location corresponding to a DMRS mapping type 1 is in a symbol 0, and a DMRS location corresponding to a DMRS mapping type 2 is in a symbol 5.

First processing: The terminal maps, by using the DMRS mapping type indicated by the DMRS mapping type indication information, a DMRS corresponding to the uplink data.

Second processing: The network device detects a DMRS by using the DMRS mapping type indicated by the DMRS mapping type indication information.

(14) Frequency Hopping Transmission Indication Information

The frequency hopping transmission indication information is information used to indicate frequency hopping transmission. Whether to perform frequency hopping transmission may be indicated by two different values of one bit. For example, a bit value 1 indicates frequency hopping transmission, and a bit value 0 indicates no frequency hopping transmission.

First processing: The terminal transmits the uplink data through frequency hopping according to the frequency hopping transmission indication information.

Second processing: The network device receives the uplink data through frequency hopping according to the frequency hopping transmission indication information.

(15) Piggyback CSI Indication Information

The piggyback CSI indication information is information used to indicate to send CSI by multiplexing a time-frequency resource for sending the uplink data. Whether to piggyback the CSI may be indicated by two different values of one bit. For example, a bit value 1 indicates to piggyback the CSI, and a bit value 0 indicates not to piggyback the CSI.

First processing: The terminal sends CSI by multiplexing, according to the piggyback CSI indication information, the time-frequency resource for sending the uplink data.

Second processing: The network device obtains, according to the piggyback CSI indication information, CSI on a time-frequency resource for receiving the uplink data.

(16) Power Offset Indication Information

The power offset indication information is used to indicate an uplink data and preamble power offset (data-deltapreamble) and/or a power offset associated with the uplink configuration (messagePowerOffset).

First processing: The terminal determines transmit power of the uplink data based on a power offset indicated by the power offset indication information.

(17) Waveform Indication Information

The waveform indication information is used to indicate a waveform used for the uplink data.

The waveform indicated by the waveform indication information may be any one of the following: cyclic prefix orthogonal frequency division multiplexing (CP-OFDM), discrete fourier transform-spread OFDM (DFT-S-OFDM), and single carrier frequency division multiple access (SC-FDMA).

First processing: The terminal sends the uplink data based on the waveform indicated by the waveform indication information.

Second processing: The network device receives the uplink data based on the waveform indicated by the waveform indication information.

(18) Index Information of a Cell

The index information of the cell is information about a cell to which a time-frequency resource of the uplink data belongs.

First processing: The terminal sends the uplink data in a cell corresponding to an index of the cell by using the time-frequency resource of the uplink data.

Second processing: The network device receives the uplink data in the cell corresponding to the index of the cell by using the time-frequency resource of the uplink data.

(19) Index Information of a BWP

The index information of the BWP is information about a BWP to which a time-frequency resource of the uplink data belongs.

First processing: The terminal sends the uplink data in a BWP corresponding to an index of the BWP by using the time-frequency resource of the uplink data.

Second processing: The network device receives the uplink data in the BWP corresponding to the index of the BWP by using the time-frequency resource of the uplink data.

(20) Index Information of a Cell During New Transmission

When the uplink data is retransmitted data, the index information of the cell during new transmission indicates information about a cell to which a time-frequency resource of the uplink data belongs when the uplink data is newly transmitted.

Second processing: The network device performs soft combination on the uplink data based on the index information of the cell during new transmission.

(21) Index Information of a BWP During New Transmission

When the uplink data is retransmitted data, the index information of the BWP during new transmission indicates information about a BWP to which a time-frequency resource of the uplink data belongs when the uplink data is newly transmitted.

Second processing: The network device performs soft combination on the uplink data based on the index information of the BWP during new transmission.

(22) Information about a HARQ Process During New Transmission

When the uplink data is retransmitted data, the information about the HARQ process during new transmission indicates information about a HARQ process used for a time-frequency resource of the uplink data when the uplink data is newly transmitted. The information about the HARQ process during new transmission may be an index of the HARQ process.

Second processing: The network device performs soft combination on the uplink data based on the information about the HARQ process during new transmission.

In one implementation, the uplink configuration includes time domain resource indication information and frequency domain resource indication information, so that the terminal determines a time-frequency resource for sending the uplink data and/or the uplink control information.

Optionally, the time domain resource indication information and the frequency domain resource indication information may be alternatively configured by using another message. In this case, the uplink configuration does not include the time domain resource indication information or the frequency domain resource indication information.

In one implementation, the uplink configuration includes MCS indication information. Further, when there are a plurality of MCS tables, the uplink configuration may further include the MCS table indication information. Alternatively, the uplink configuration includes one piece of indication information, and the indication information is used to indicate an MCS table and an MCS. In addition, the uplink configuration may further include time domain resource indication information and frequency domain resource indication information.

In one implementation, the uplink configuration includes TBS indication information. This implementation may also be combined with the foregoing two implementations, that is, content included in the uplink configuration in the foregoing two implementations is included.

The other information described above may be sent by the terminal to the network device, or may be configured by the network device for the terminal. In addition, the information may not be transmitted between the terminal and the network device, some information may be preconfigured, some information may be transmitted by using another message, and some information may be transmitted or not transmitted as required. For example, any piece of information in the precoding indication information, the sending repetition count indication information, the sending repetition indication information, the DMRS mapping type indication information, the frequency hopping transmission indication information, the piggyback CSI indication information, the index information of the cell, and the index information of the BWP may not be sent by the terminal to the network device, or may not be configured by the network device for the terminal. This may be specifically selected as required. When the network device needs to configure the information for the terminal, the information may be configured in another message instead of sending the information to the terminal by using the foregoing uplink configuration.

The following describes meanings of information that may be included in the random access configuration in this embodiment of this application as follows:

(1) Time domain resource indication information

The time domain resource indication information is information used to indicate a time domain resource for sending the preamble (to be specific, a time domain resource in a PRACH resource).

(2) Frequency domain resource indication information

The frequency domain resource indication information is information used to indicate a frequency domain resource for sending the preamble (to be specific, a frequency domain resource in a PRACH resource).

(3) At least one preamble index (4) Root sequence indication information

The root sequence indication information is information used to indicate a root sequence, and the root sequence indication information may be a root sequence index.

The terminal may determine the sent preamble based on (3) and (4).

(5) Maximum transmission count indication information

The maximum transmission count indication information is information used to indicate a maximum transmission count of the preamble.

(6) Receive window length indication information

The receive window length indication information is information used to indicate a length of a receive window for receiving the response message of the first message.

(7) Preamble power ramp step indication information

The preamble power ramp step indication information is information used to indicate a power ramp step of the preamble.

(8) SCS indication information

The SCS indication information is information used to indicate an SCS for sending the preamble.

(9) Scaling factor indication information of a backoff indication

The scaling factor indication information of the backoff indication is information used to indicate a scaling factor of the backoff indication, and is used to determine a sending latency time before the terminal initiates preamble retransmission when random access is not completed. For example, if a latency time indicated by a network is 200 ms, and the terminal randomly selects a value A from 0 to 200 ms, the latency time of the terminal is A×Scaling factor. The scaling factor ranges from 0 to 1.

(10) Sending repetition count indication information

The sending repetition count indication information is information used to indicate a sending repetition count of the preamble.

The foregoing method is described by using the following two specific embodiments as an example. It should be noted that nouns or terms in the embodiments of this application may be mutually referenced. This is not limited.

Embodiment 1

Figure 4:
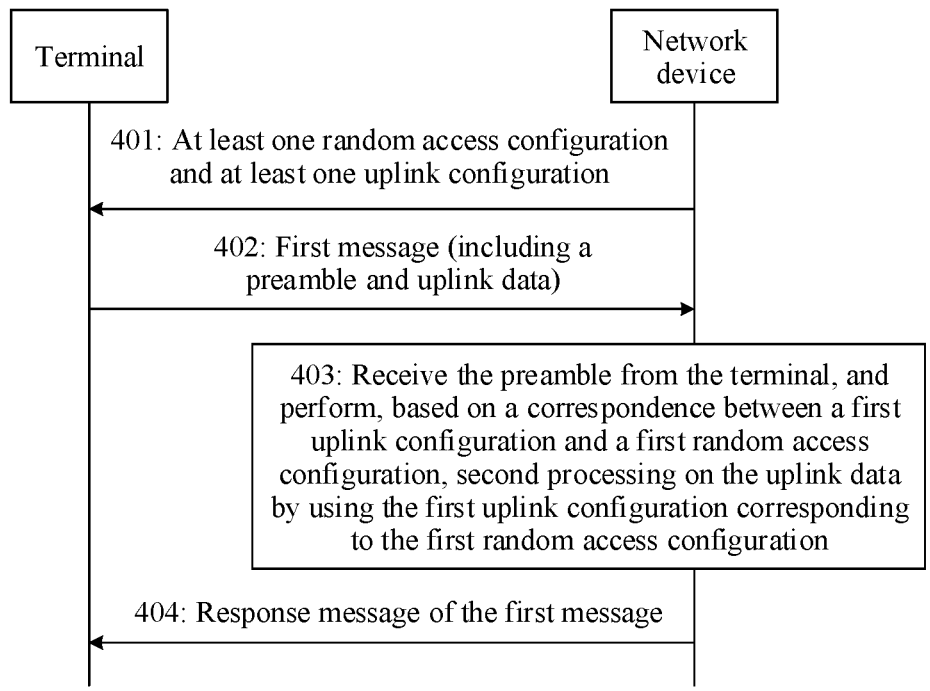
FIG. 4 is a flowchart of another communication method according to an embodiment of this application.

Referring to FIG. 4, the method includes the following steps.

401. A terminal receives at least one random access configuration and at least one uplink configuration from a network device.

There is a correspondence between the at least one random access configuration and the at least one uplink configuration. For related descriptions of the correspondence, refer to the foregoing descriptions.

The uplink configuration includes any one or more types of the following information: MCS table indication information, MCS indication information, time domain resource indication information, frequency domain resource indication information, TBS indication information, RV indication information, HARQ process indication information, new transmission or retransmission indication information, SCS indication information, precoding indication information, sending repetition count indication information, sending repetition indication information, DMRS mapping type indication information, frequency hopping transmission indication information, piggyback CSI indication information, power offset indication information, index information of a cell, and index information of a BWP.

402. The terminal sends a first message (Msg1) to the network device based on the at least one random access configuration and the at least one uplink configuration and the correspondence between the at least one random access configuration and the at least one uplink configuration, where the first message includes a preamble and uplink data (UL data). Correspondingly, the network device receives the first message from the terminal.

In specific implementation, step 402 may include: The terminal determines a first uplink configuration corresponding to the uplink data from the at least one uplink configuration, sends the uplink data to the network device based on the first uplink configuration, determines, based on the correspondence between the at least one random access configuration and the at least one uplink configuration, a first random access configuration corresponding to the first uplink configuration, and sends the preamble to the network device based on the first random access configuration.

403. The network device receives the preamble from the terminal, and performs second processing on the uplink data based on a correspondence between the first uplink configuration and the first random access configuration by using the first uplink configuration corresponding to the first random access configuration.

In specific implementation, step 403 may include: The network device receives the preamble from the terminal; the network device determines the first random access configuration based on the preamble; the network device determines, based on the correspondence between the first uplink configuration and the first random access configuration, the first uplink configuration corresponding to the first random access configuration; and the network device performs second processing on the uplink data based on the first uplink configuration.

404. The network device sends a response message of the first message to the terminal. Correspondingly, the terminal receives the response message of the first message from the network device.

The response message of the first message may be used to notify the terminal that the preamble is successfully decoded, or the response message of the first message may be used to notify the terminal that the preamble and the uplink data are successfully decoded.

It should be noted that after step 401 to step 404, if the terminal needs to perform contention-based random access again, only step 402 to step 404 may be performed, and step 401 is not performed.

Embodiment 2

Figure 5:
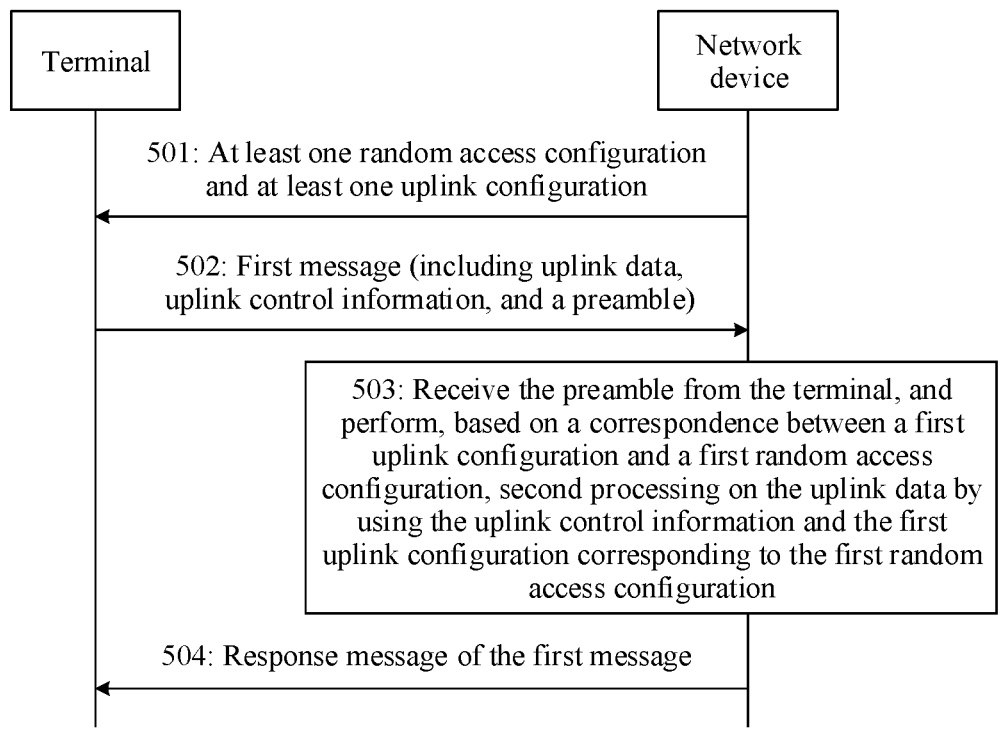
FIG. 5 is a flowchart of yet another communication method according to an embodiment of this application.

Referring to FIG. 5, the method includes the following steps.

501. A terminal receives at least one random access configuration and at least one uplink configuration from a network device.

There is a correspondence between the at least one random access configuration and the at least one uplink configuration. For related descriptions of the correspondence, refer to the foregoing descriptions.

The uplink configuration includes any one or more types of the following information: MCS table indication information, MCS indication information, time domain resource indication information, frequency domain resource indication information, and TBS indication information. The time domain resource indication information associated with the uplink configuration may include time domain resource indication information used to transmit uplink data and/or uplink control information, and the frequency domain resource indication information may include frequency domain resource indication information used to transmit the uplink data and/or the uplink control information.

502. The terminal sends a first message (Msg1) to the network device based on the at least one random access configuration and the at least one uplink configuration and the correspondence between the at least one random access configuration and the at least one uplink configuration, where the first message includes the uplink data, the uplink control information, and a preamble. Correspondingly, the network device receives the first message from the terminal.

In specific implementation, step 502 may include: The terminal determines a first uplink configuration corresponding to the uplink data from the at least one uplink configuration, sends the uplink data and the uplink control information to the network device based on the first uplink configuration, determines, based on the correspondence between the at least one random access configuration and the at least one uplink configuration, a first random access configuration corresponding to the first uplink configuration, and sends the preamble to the network device based on the first random access configuration.

503. The network device receives the preamble from the terminal, and performs second processing on the uplink data based on the uplink control information and a correspondence between the first uplink configuration and the first random access configuration by using the first uplink configuration corresponding to the first random access configuration.

In specific implementation, step 503 may include: The network device receives the preamble from the terminal; the network device determines the first random access configuration based on the preamble; the network device determines, based on the correspondence between the first uplink configuration and the first random access configuration, the first uplink configuration corresponding to the first random access configuration; and the network device performs second processing on the uplink data based on the first uplink configuration and the uplink control information.

504. The network device sends a response message of the first message to the terminal. Correspondingly, the terminal receives the response message of the first message from the network device.

The response message of the first message may be used to notify the terminal that the preamble is successfully decoded, or the response message of the first message may be used to notify the terminal that the preamble and the uplink data are successfully decoded.

It should be noted that after step 501 to step 504, if the terminal needs to perform contention-based random access again, only step 502 to step 504 may be performed, and step 501 is not performed.

It may be learned from steps in Embodiment 1 and Embodiment 2 that, after the terminal obtains a correspondence between a random access configuration and an uplink configuration, for the terminal, a contention-based random access process can be implemented only through two steps (one step is to send the first message to the network device and the other step is to receive the response message of the first message from the network device). In comparison with four steps of a random access process in the prior art, a random access procedure of the terminal is simplified, and signaling overheads and latency between the terminal and the network device are reduced.

Figure 6:
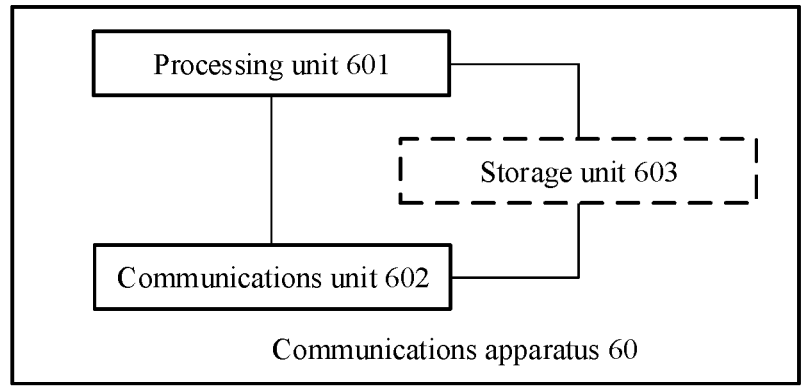
FIG. 6 is a schematic composition diagram of a communications apparatus according to an embodiment of this application.

An embodiment of this application further provides a communications apparatus 60 for implementing the foregoing methods. The communications apparatus 60 may be the foregoing terminal or network device. Referring to FIG. 6, the communications apparatus 60 may include a processing unit 601 and a communications unit 602, and may further include a storage unit 603. The communications unit may also be referred to as a transceiver unit.

When the communications apparatus 60 is a terminal, the processing unit 601 is configured to control and manage an action of the terminal. For example, the processing unit 601 is configured to support the terminal in performing steps 201 and 202 in FIG. 2, steps 401, 402, and 404 in FIG. 4, steps 501, 502, and 504 in FIG. 5, and/or an action performed by the terminal in another process described in the embodiments of this application. The communications unit 602 is configured to support the terminal in communicating with another network device, for example, communicating with the network device in FIG. 4. The storage unit 603 is configured to store program code and data of the terminal.

When the communications apparatus 60 is a network device, the processing unit 601 is configured to control and manage an action of the network device. For example, the processing unit 601 is configured to support the network device in performing steps 202 and 203 in FIG. 2, steps 402 to 404 in FIG. 4, steps 502 to 504 in FIG. 5, and/or an action performed by the network device in another process described in the embodiments of this application. The communications unit 602 is configured to support the network device in communicating with another device, for example, communicating with the terminal in FIG. 4. The storage unit 603 is configured to store program code and data of the network device.

It should be understood that division into the units in the communications apparatus 60 is merely logical function division. During actual implementation, all or some of the units may be integrated into a physical entity, or may be physically separate. In addition, all the units in the communications apparatus 60 may be implemented in a form of software invoked by a processing element, or may be implemented in a form of hardware; or some units may be implemented in a form of software invoked by a processing element, and some units may be implemented in a form of hardware. For example, each unit may be an independently disposed processing element, or may be integrated into a chip of the apparatuses for implementation. Alternatively, each unit may be stored in a memory in a form of a program to be invoked by a processing element of the apparatuses to perform a function of the unit. In addition, all or some of the units may be integrated together, or may be implemented independently. The processing element herein may also be referred to as a processor, and may be an integrated circuit having a signal processing capability. In an implementation process, the steps in the foregoing methods or the foregoing units may be implemented by using a hardware integrated logic circuit of the processor element, or may be implemented in a form of software invoked by the processing element.

In an example, a unit in any one of the foregoing apparatuses may be one or more integrated circuits configured to implement the foregoing methods, for example, one or more specific integrated circuits (ASICs), one or more microprocessors (for example, digital signal processors (DSPs)), one or more field programmable gate arrays (FPGAs), or a combination of at least two of these types of integrated circuits. For another example, when a unit in the communications apparatus 60 may be implemented by a program scheduled by a processing element, the processing element may be a general purpose processor, for example, a central processing unit (CPU) or another processor that can invoke the program. For still another example, the units may be integrated and implemented in a form of a system-on-a-chip (SOC).

The foregoing unit for receiving (namely, the communications unit 602) is an interface circuit of the communications apparatus 60, and is configured to receive a signal from another apparatus. For example, when the communications apparatus 60 is implemented in a form of a chip, the unit for receiving is an interface circuit that is of the chip and that is configured to receive a signal from another chip or apparatus. The foregoing unit for sending (namely, the communications unit 602) is an interface circuit of the communications apparatus 60, and is configured to send a signal to another apparatus. For example, when the communications apparatus 60 is implemented in a form of a chip, the unit for sending is an interface circuit that is of the chip and that is configured to send a signal to another chip or apparatus.

Figure 7:
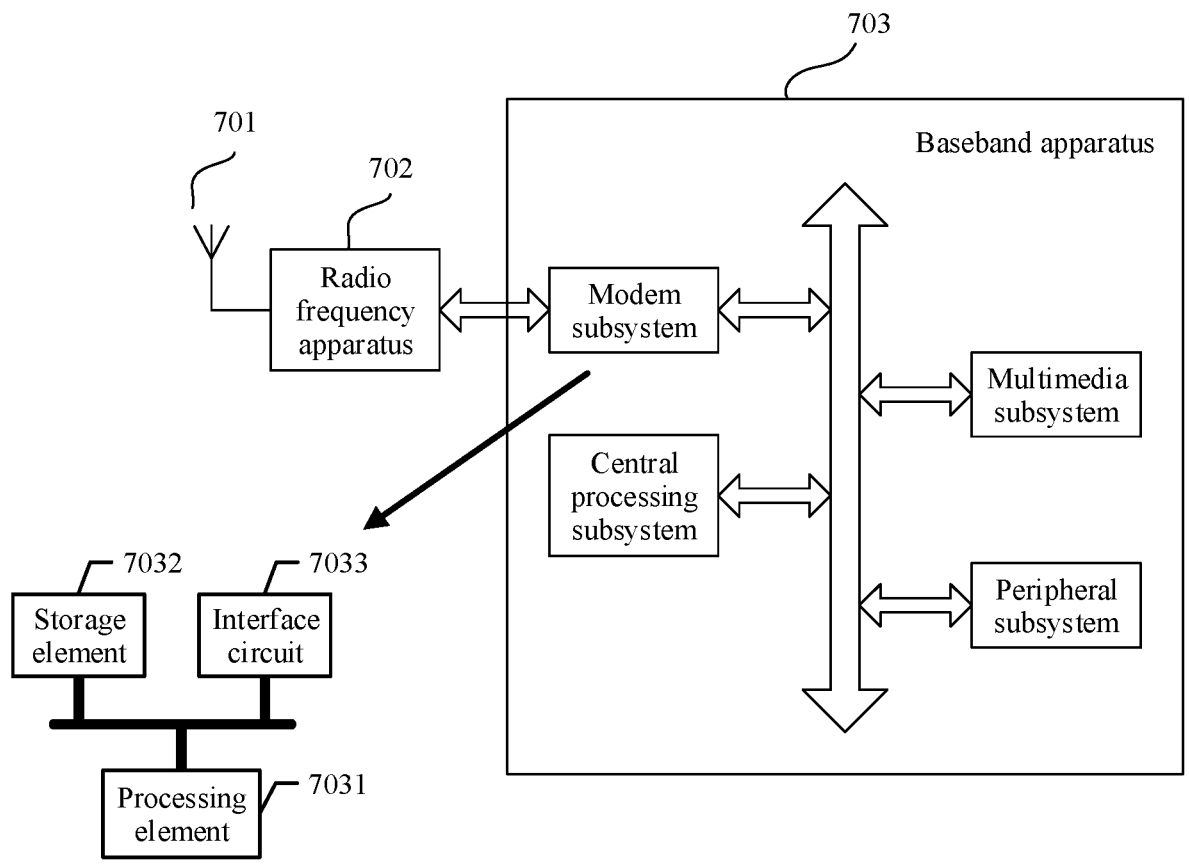
FIG. 7 is a schematic diagram of a hardware structure of a terminal according to an embodiment of this application.

An embodiment of this application further provides a schematic structural diagram of hardware of a terminal. The terminal may be the terminal in the foregoing embodiments, and is configured to implement operations of the terminal in the foregoing embodiments. As shown in FIG. 7, the terminal includes an antenna 701, a radio frequency apparatus 702, and a baseband apparatus 703. The antenna 701 is connected to the radio frequency apparatus 702. In a downlink direction, the radio frequency apparatus 702 receives, through the antenna 701, information sent by a network device (for example, receives the at least one uplink configuration and the at least one random access configuration in step 201, step 401, or step 501, or receives the response message of the first message in step 404 or step 504), and sends, to the baseband apparatus 703 for processing, the information sent by the network device. In an uplink direction, the baseband apparatus 703 processes information of the terminal, and sends the information to the radio frequency apparatus 702. After processing the information of the terminal, the radio frequency apparatus 702 sends the information to the network device (for example, sends the uplink data and the preamble in step 202, or sends the first message in step 402 or step 502) through the antenna 701.

The baseband apparatus 703 may include a modem subsystem, configured to process various communications protocol layers of data. The baseband apparatus 703 may further include a central processing subsystem, configured to process an operating system and an application layer of the terminal. In addition, the baseband apparatus 703 may further include another subsystem, for example, a multimedia subsystem or a peripheral subsystem. The multimedia subsystem is configured to control a camera or a screen display of the terminal, and the peripheral subsystem is configured to implement a connection to another device. The modem subsystem may be a separately disposed chip. Optionally, the foregoing apparatus used for the terminal may be located in the modem subsystem.

The modem subsystem may include one or more processing elements 7031, for example, include one main control CPU and another integrated circuit. In addition, the modem subsystem may further include a storage element 7032 and an interface circuit 7033. The processing element 7031 is configured to perform steps of any method performed by the foregoing terminal. The storage element 7032 is configured to store data and a program. However, a program used to perform the methods performed by the terminal in the foregoing methods may not be stored in the storage element 7032, but is stored in a memory outside the modem subsystem, and is loaded and used by the modem subsystem when to be used. The interface circuit 7033 is configured to communicate with another subsystem. The modem subsystem may be implemented by using a chip.

In an implementation, units of the terminal that implement the steps in the foregoing methods may be implemented by a processing element scheduling a program. For example, the apparatus used for the terminal includes a processing element and a storage element. The processing element invokes a program stored in the storage element, to perform the methods performed by the terminal in the foregoing method embodiments. The storage element may be a storage element located on a same chip as the processing element, namely, an on-chip storage element.

In another implementation, the program used to perform the methods performed by the terminal in the foregoing methods may be in a storage element located on a different chip from the processing element, namely, an off-chip storage element. In this case, the processing element invokes or loads the program from the off-chip storage element to the on-chip storage element, to invoke and perform the methods performed by the terminal in the foregoing method embodiments.

In still another implementation, units of the terminal that implement the steps in the foregoing methods may be configured as one or more processing elements. These processing elements are disposed in the modem subsystem. The processing element herein may be an integrated circuit, for example, one or more ASICs, one or more DSPs, one or more FPGAs, or a combination of these types of integrated circuits. These integrated circuits may be integrated together to form a chip.

Units of the terminal that implement the steps in the foregoing methods may be integrated together and implemented in a form of an SOC, and the SOC chip is configured to implement the foregoing methods. At least one processing element and storage element may be integrated into the chip, and the processing element invokes a program stored in the storage element to implement the foregoing methods performed by the terminal. Alternatively, at least one integrated circuit may be integrated into the chip, to implement the foregoing methods performed by the terminal. Alternatively, with reference to the foregoing implementations, functions of some units may be implemented by the processing element invoking a program, and functions of some units may be implemented by the integrated circuit.

It can be learned that the foregoing apparatus used for the terminal may include at least one processing element and interface circuit. The at least one processing element is configured to perform any one of the methods that are provided in the foregoing method embodiments and performed by the terminal. The processing element may perform some or all steps performed by the terminal, in a first manner, to be specific, by invoking the program stored in the storage element; or may perform some or all steps performed by the terminal, in a second manner, to be specific, by using a hardware integrated logic circuit in the processor element in combination with an instruction; or may certainly perform, by combining the first manner and the second manner, some or all steps performed by the terminal.

As described above, the processing element herein may be a general purpose processor, for example, a CPU, or may be one or more integrated circuits configured to implement the foregoing methods, for example, one or more ASICs, one or more DSPs, one or more FPGAs, or a combination of at least two of the integrated circuits.

The storage element may be one memory, or may be a general term of a plurality of storage elements.

Figure 8:
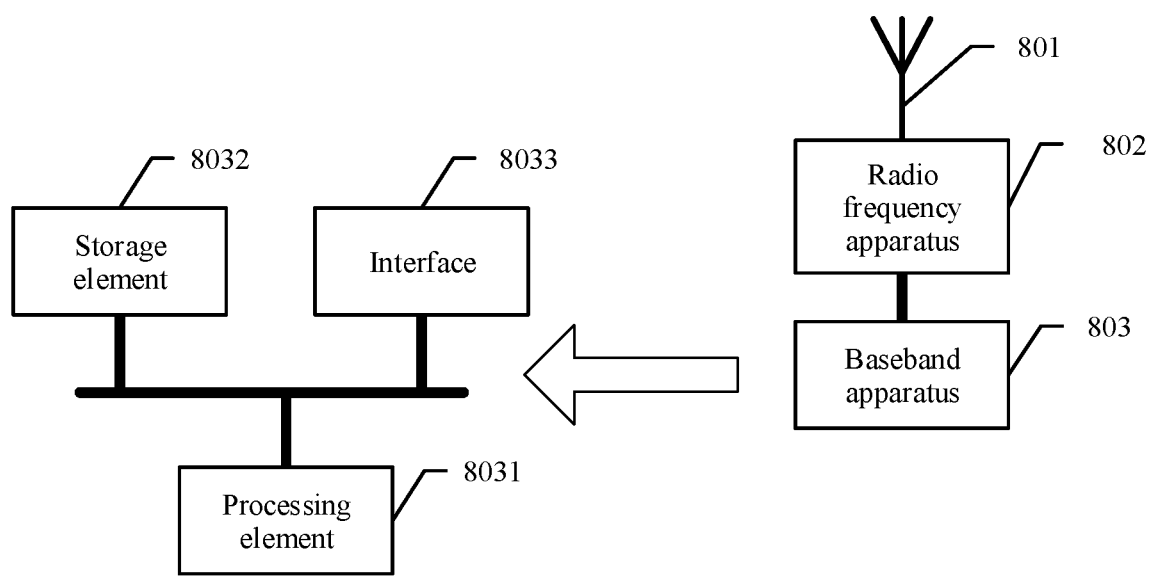
FIG. 8 is a schematic diagram of a hardware structure of a network device according to an embodiment of this application.

An embodiment of this application further provides a schematic structural diagram of hardware of a network device. The network device may be the network device in the foregoing embodiments, and is configured to implement operations of the network device in the foregoing embodiments. As shown in FIG. 8, the network device includes an antenna 801, a radio frequency apparatus 802, and a baseband apparatus 803. The antenna 801 is connected to the radio frequency apparatus 802. In an uplink direction, the radio frequency apparatus 802 receives, through the antenna 801, information sent by a terminal (for example, receives the uplink data and the preamble in step 202, or receives the first message in step 402 and step 502), and sends, to the baseband apparatus 803 for processing, the information sent by the terminal. In a downlink direction, the baseband apparatus 803 processes information of the terminal, and sends the information to the radio frequency apparatus 802. After processing the information of the terminal, the radio frequency apparatus 802 sends the information to the terminal (for example, sends the at least one uplink configuration and the at least one random access configuration in step 201, step 401, or step 501, or sends the response message of the first message in step 404 or step 504) through the antenna 801.

The baseband apparatus 803 may include one or more processing elements 8031, for example, include one main control CPU and another integrated circuit. In addition, the baseband apparatus 803 may further include a storage element 8032 and an interface 8033. The storage element 8032 is configured to store a program and data. The interface 8033 is configured to exchange information with the radio frequency apparatus 802. The interface is, for example, a common public radio interface (CPRI). The foregoing apparatus used for the network device may be located in the baseband apparatus 803. For example, the foregoing apparatus used for the network device may be a chip on the baseband apparatus 803. The chip includes at least one processing element and an interface circuit. The processing element is configured to perform the steps of any one of the methods performed by the network device. The interface circuit is configured to communicate with another apparatus.

In an implementation, units of the network device that implement the steps in the foregoing methods may be implemented by a processing element scheduling a program. For example, the apparatus used for the network device includes a processing element and a storage element. The processing element invokes a program stored in the storage element, to perform the methods performed by the network device in the foregoing method embodiments. The storage element may be a storage element located on a same chip as the processing element, namely, an on-chip storage element, or may be a storage element located on a different chip from the processing element, namely, an off-chip storage element.

In another implementation, units of the network device that implement the steps in the foregoing methods may be configured as one or more processing elements. These processing elements are disposed in the baseband apparatus. The processing element herein may be an integrated circuit, for example, one or more ASICs, one or more DSPs, one or more FPGAs, or a combination of these types of integrated circuits. These integrated circuits may be integrated together to form a chip.

Units of the network device that implement the steps in the foregoing methods may be integrated together, and implemented in a form of an SOC. For example, the baseband apparatus includes the SOC chip, configured to implement the foregoing methods. At least one processing element and storage element may be integrated into the chip, and the processing element invokes a program stored in the storage element to implement the foregoing methods performed by the network device. Alternatively, at least one integrated circuit may be integrated into the chip, to implement the foregoing methods performed by the network device. Alternatively, with reference to the foregoing implementations, functions of some units may be implemented by the processing element invoking a program, and functions of some units may be implemented by the integrated circuit.

It can be learned that the foregoing apparatus used for the network device may include at least one processing element and interface circuit. The at least one processing element is configured to perform any one of the methods that are provided in the foregoing method embodiments and performed by the network device. The processing element may perform some or all steps performed by the network device, in a first manner, to be specific, by invoking the program stored in the storage element; or may perform some or all steps performed by the network device, in a second manner, to be specific, by using a hardware integrated logic circuit in the processor element in combination with an instruction; or may certainly perform, by combining the first manner and the second manner, some or all steps performed by the network device.

As described above, the processing element herein may be a general purpose processor, for example, a CPU, or may be one or more integrated circuits configured to implement the foregoing methods, for example, one or more ASICs, one or more DSPs, one or more FPGAs, or a combination of at least two of the integrated circuits.

The storage element may be one memory, or may be a general term of a plurality of storage elements.

An embodiment of this application further provides a communications system. The communications system includes the foregoing terminal and the foregoing network device.

An embodiment of this application further provides a computer storage medium. The computer storage medium includes a computer instruction. When the computer instruction is run on a processor, the processor is enabled to perform any method provided in the foregoing embodiments.

An embodiment of this application further provides a computer program product including an instruction. When the instruction is run on a processor, the processor is enabled to perform any method provided in the foregoing embodiments.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer program instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state disk or SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely example description of this application defined by the accompanying claims, and are considered as any of or all modifications, variations, combinations, or equivalents that cover the scope of this application.

What is claimed is:

1. A communication method, comprising:
   receiving, by a terminal from a network device, at least one uplink configuration used to indicate a parameter for sending uplink data, wherein the at least one uplink configuration comprises a first uplink configuration;
   receiving, by the terminal from the network device, at least one random access configuration used to indicate a parameter for sending a preamble, wherein the at least one random access configuration comprises a first random access configuration, and wherein there is a correspondence between the first uplink configuration and the first random access configuration;
   obtaining, by the terminal from the network device, a first correspondence between the at least one uplink configuration and the at least one random access configuration, wherein the first correspondence comprises the correspondence between the first uplink configuration and the first random access configuration; and
   based on the correspondence between the first uplink configuration and the first random access configuration, sending, by the terminal, the uplink data to the network device using the first uplink configuration, and sending, by the terminal, the preamble to the network device using the first random access configuration.

2. The method according to claim 1, wherein the sending, by the terminal, the uplink data to the network device using the first uplink configuration, and the sending, by the terminal, the preamble to the network device using the first random access configuration comprises:
   determining, by the terminal, that the first uplink configuration corresponds to the uplink data;
   determining, by the terminal based on the correspondence between the first uplink configuration and the first random access configuration, the first random access configuration corresponding to the first uplink configuration; and
   sending, by the terminal, the uplink data to the network device using the first uplink configuration, and sending, by the terminal, the preamble to the network device using the first random access configuration.

3. The method according to claim 2, wherein the determining, by the terminal, that the first uplink configuration corresponds to the uplink data comprises:
   determining, by the terminal, based on channel state information, a data amount of to-be-sent data, or service information of to-be-sent data, that the first uplink configuration corresponds to the uplink data.

4. The method according to claim 1, wherein the at least one uplink configuration comprises any one or more types of the following information:
   modulation and coding scheme (MCS) table indication information,
   MCS indication information,
   time domain resource indication information,
   frequency domain resource indication information, or
   transport block size (TBS) indication information.

5. The method according to claim 4, wherein the at least one uplink configuration further comprises any one or more types of the following information:
   demodulation reference signal (DMRS) mapping type indication information, or
   frequency hopping indication information.

6. The method according to claim 1, further comprising:
   receiving, by the terminal, a response message of the uplink data from the network device, wherein the response message comprises one or more of first indication information or second indication information, wherein the first indication information is used to indicate whether the response message comprises an uplink grant field, and the second indication information is used to indicate whether the response message comprises a contention resolution field.

7. An apparatus comprising:
   a memory; and
   one or more processors coupled to the memory, wherein the one or more processors are configured to:
      receive, from a network device, at least one uplink configuration used to indicate a parameter for sending uplink data, wherein the at least one uplink configuration comprises a first uplink configuration;
      receive, from the network device, at least one random access configuration used to indicate a parameter for sending a preamble, wherein the at least one random access configuration comprises a first random access configuration, and wherein there is a correspondence between the first uplink configuration and the first random access configuration;
      obtain, from the network device, a first correspondence between the at least one uplink configuration and the at least one random access configuration, wherein the first correspondence comprises the correspondence between the first uplink configuration and the first random access configuration; and
      based on the correspondence between the first uplink configuration and the first random access configuration, send the uplink data to the network device using the first uplink configuration, and send the preamble to the network device using the first random access configuration.

8. The apparatus according to claim 7, wherein the sending the uplink data to the network device using the first uplink configuration, and the sending the preamble to the network device using the first random access configuration comprises:
   determining that the first uplink configuration corresponds to the uplink data;
   determining, based on the correspondence between the first uplink configuration and the first random access configuration, the first random access configuration corresponding to the first uplink configuration; and
   sending the uplink data to the network device using the first uplink configuration, and sending the preamble to the network device using the first random access configuration.

9. The apparatus according to claim 8, wherein the determining that the first uplink configuration corresponds to the uplink data comprises:
   determining, based on channel state information, a data amount of to-be-sent data, or service information of to-be-sent data, that the first uplink configuration corresponds to the uplink data.

10. The apparatus according to claim 7, wherein the at least one uplink configuration comprises any one or more types of the following information:
    modulation and coding scheme (MCS) table indication information,
    MCS indication information,
    time domain resource indication information,
    frequency domain resource indication information, or
    transport block size (TBS) indication information.

11. The apparatus according to claim 10, wherein the at least one uplink configuration further comprises any one or more types of the following information:
    demodulation reference signal (DMRS) mapping type indication information, or
    frequency hopping indication information.

12. The apparatus according to claim 7, wherein the one or more processors are further configured to:
    receive a response message of the uplink data from the network device, wherein the response message comprises one or more of first indication information or second indication information, wherein the first indication information is used to indicate whether the response message comprises an uplink grant field, and the second indication information is used to indicate whether the response message comprises a contention resolution field.

13. An apparatus comprising:
    a memory; and
    one or more processors coupled to the memory, wherein the one or more processors are configured to:
       send at least one uplink configuration and at least one random access configuration to a terminal, wherein the at least one uplink configuration comprises a first uplink configuration, and the at least one random access configuration comprises a first random access configuration;
       receive a preamble from the terminal, wherein the preamble is received using a first random access configuration, and wherein there is a correspondence between the first random access configuration and the first uplink configuration; and
       process uplink data using the first uplink configuration corresponding to the first random access configuration based on the correspondence between the first random access configuration and the first uplink configuration.

14. The apparatus according to claim 13, wherein the one or more processors are further configured to:
    send, to the terminal, a first correspondence between the at least one uplink configuration and the at least one random access configuration, wherein the first correspondence comprises the correspondence between the first uplink configuration and the first random access configuration.

15. The apparatus according to claim 13, wherein the at least one uplink configuration comprises any one or more types of the following information:
modulation and coding scheme (MCS) table indication information,
MCS indication information,
time domain resource indication information,
frequency domain resource indication information, or
transport block size (TBS) indication information.

16. The apparatus according to claim 15, wherein the at least one uplink configuration further comprises any one or more types of the following information:
demodulation reference signal (DMRS) mapping type indication information, or
frequency hopping indication information.

17. The apparatus according to claim 13, wherein the one or more processors are further configured to:
send a response message of the uplink data to the terminal, wherein the response message comprises one or more of first indication information or second indication information, wherein the first indication information is used to indicate whether the response message comprises an uplink grant field, and the second indication information is used to indicate whether the response message comprises a contention resolution field.

* * * * *